United States Patent
Blitz et al.

(10) Patent No.: US 9,140,403 B2
(45) Date of Patent: Sep. 22, 2015

(54) SINGLE-AXIS DRIVE SYSTEM AND METHOD

(75) Inventors: Jonathan N. Blitz, Durham, NC (US); Peter Childers, Palo Alto, CA (US); James Carucci, New Hartford, NY (US); Ronald Draper, Poland, NY (US)

(73) Assignee: CBE Global Holdings, Inc., Palo Alto, CA (US)

( * ) Notice: Subject to any disclaimer, the term of this patent is extended or adjusted under 35 U.S.C. 154(b) by 1193 days.

(21) Appl. No.: 12/919,802

(22) PCT Filed: Feb. 10, 2009

(86) PCT No.: PCT/US2009/000825
§ 371 (c)(1),
(2), (4) Date: May 4, 2011

(87) PCT Pub. No.: WO2009/108273
PCT Pub. Date: Sep. 3, 2009

(65) Prior Publication Data
US 2011/0219759 A1      Sep. 15, 2011

Related U.S. Application Data

(63) Continuation-in-part of application No. PCT/US2008/006660, filed on May 23, 2008.

(60) Provisional application No. 61/064,351, filed on Feb. 29, 2008, provisional application No. 61/136,964, filed on Oct. 17, 2008.

(51) Int. Cl.
| | | |
|---|---|---|
| *F16M 11/42* | (2006.01) |
| *F16M 11/18* | (2006.01) |
| *F16M 11/08* | (2006.01) |
| *F16M 11/10* | (2006.01) |
| *F16M 11/20* | (2006.01) |
| *F24J 2/38* | (2014.01) |
| *F24J 2/54* | (2006.01) |
| *H01L 31/042* | (2014.01) |

(52) U.S. Cl.
CPC ............... *F16M 11/18* (2013.01); *F16M 11/08* (2013.01); *F16M 11/10* (2013.01); *F16M 11/2014* (2013.01); *F24J 2/38* (2013.01); *F24J 2/541* (2013.01); *F24J 2/542* (2013.01); *H01L 31/0422* (2013.01); *F24J 2002/5437* (2013.01); *F24J 2002/5482* (2013.01); *Y02E 10/46* (2013.01); *Y02E 10/47* (2013.01); *Y02E 10/50* (2013.01)

(58) Field of Classification Search
CPC ......... Y02E 10/47; Y02E 10/46; Y02E 10/50; F15B 9/02; F15B 9/14; F15B 13/02; F15B 15/12; F15B 2211/6336; F16M 11/18; F16M 11/08; F16M 11/10; F16M 11/2014; F24J 2/38; F24J 2/541; F24J 2/542; F24J 2002/5437; F24J 2002/5482; H01L 31/0422
USPC .... 92/39, 121, 122; 91/363 R, 368 R, 353 A; 60/472, 470; 250/203.4
See application file for complete search history.

(56) References Cited

U.S. PATENT DOCUMENTS

| | | | |
|---|---|---|---|
| 3,051,143 A | 8/1962 | Nee | |
| 3,070,075 A | 12/1962 | Hanselmann | |
| 3,137,214 A | 6/1964 | Feld et al. | |
| 3,246,580 A | 4/1966 | Huska | |
| 3,977,648 A * | 8/1976 | Sigmon | 251/59 |
| 3,985,118 A | 10/1976 | Bard | |
| 4,575,027 A * | 3/1986 | Cronin | 244/99.12 |
| 4,586,488 A * | 5/1986 | Noto | 126/578 |
| 4,611,797 A | 9/1986 | Cetnarowski | |
| 4,878,417 A | 11/1989 | Facon | |
| 5,103,551 A * | 4/1992 | Tamura et al. | 29/559 |
| 5,634,334 A | 6/1997 | Hehl | |
| 5,911,362 A * | 6/1999 | Wood et al. | 239/1 |
| 6,058,930 A | 5/2000 | Shingleton | |
| 6,070,513 A * | 6/2000 | MacDonald | 91/176 |
| 2002/0190068 A1* | 12/2002 | Sisk et al. | 220/263 |
| 2006/0112685 A1* | 6/2006 | Devier et al. | 60/422 |
| 2008/0143280 A1* | 6/2008 | Rock | 318/16 |
| 2009/0211160 A1* | 8/2009 | Tehranchi | 49/360 |

FOREIGN PATENT DOCUMENTS

| DE | 1-295-381 | 5/1969 |
|---|---|---|
| JP | 2003-324210 | 11/2003 |
| KR | 10-2007-0044333 | 4/2007 |
| KR | 10-20070044333 | 4/2007 |
| WO | WO 2009-108273 | 9/2009 |

OTHER PUBLICATIONS

International Search Report, Sep. 16, 2009 in counterpart foreign application under the WIPO, Application No. PCT/US2009/000825.
International Search Report issued in PCT/US2009/000825, mailed on Sep. 16, 2009.
Supplemental European Search Report issued in European Patent Application No. 10741499.7-1751 mailed on Jan. 23, 2014.
State Intellectual Property of China Search Report issued in Chinese Application No. 201080015599.6 mailed on Jul. 17, 2014.

* cited by examiner

*Primary Examiner* — Ned Landrum
*Assistant Examiner* — Logan Kraft

(74) *Attorney, Agent, or Firm* — Andrews Kurth LLP; Aldo Noto; Matthew J. Esserman

(57) ABSTRACT

A system for moving an object in one axis that creates highly dispersed but precisely controlled mechanical force to support, manipulate, and maintain an object, tool or application in precise alignment or orientation with respect to a stationary or moving target is disclosed. The system includes one or more fluid containers within a cylindrical enclosure or drum, and a shaft running through longitudinal axis of the drum. The shaft is coupled to the drum by rotating assemblies so that the drum may rotate around the shaft or the draft may rotate inside the drum. The fluid inflatable containers are arranged in a inside the drum around the shaft so that each container exerts expansive force between a vane fixed to the drum and a vane fixed to the shaft. A volume of the fluid may be placed in the one or more fluid containers by control systems. By changing the volume of fluid in the one or more containers, forces are exerted on the vanes and the object is moved.

15 Claims, 8 Drawing Sheets

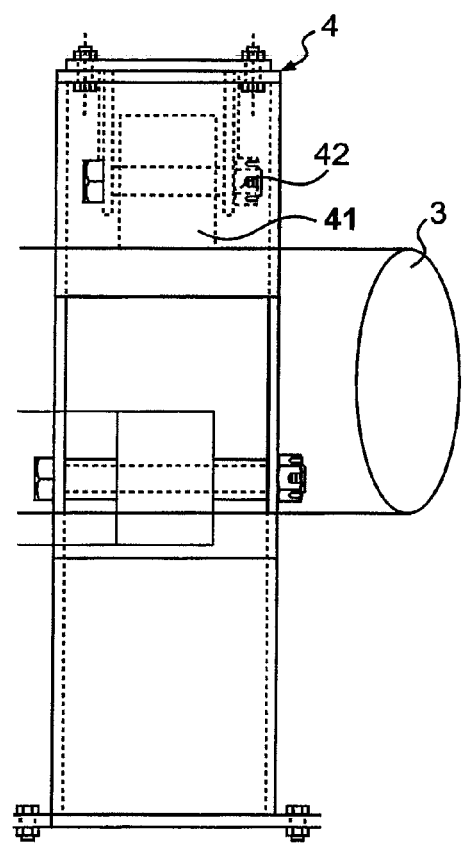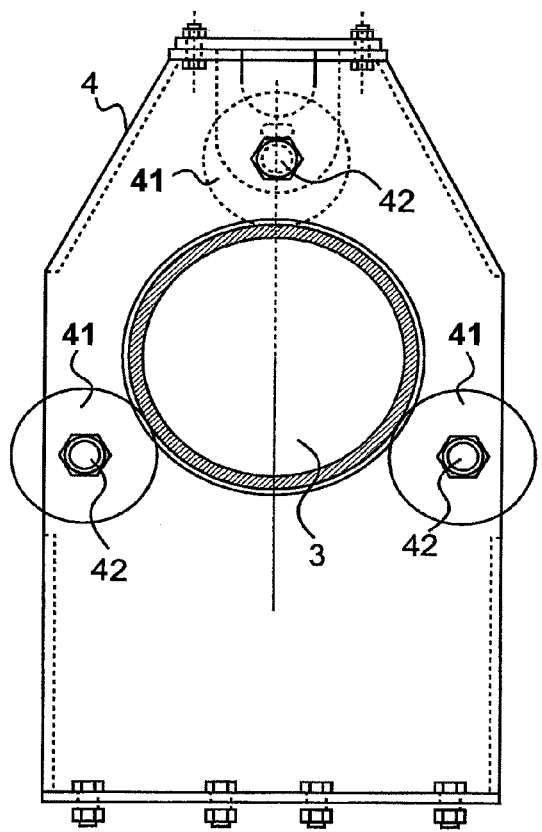
FIG. 10A  FIG. 10B

SINGLE-AXIS DRIVE SYSTEM AND METHOD

This application is a 371 of PCT/US2009/000825, filed Feb. 10, 2009, which is a Continuation-In-Part of PCT/US2008/006660, filed May 23, 2008, and is a non-provisional of U.S. 61/064,351, filed Feb. 29, 2008, and is a non-provisional of 61/136,964, filed Oct. 17, 2008, all of which are hereby incorporated by reference in their entirety.

TECHNICAL FIELD

The technical field relates to methods and systems for moving an object in one axis as well as supporting and moving an object in one axis. The system for supporting and moving an object in one axis may be applied to any of a wide variety of fields as a complete replacement for older technologies, mechanisms, and methods for moving, driving, positioning, or actuating objects or loads in precise or non-precise single-axis orientation. The system and method may also be applied to multi-axis positioning when deployed as a pair of actuators such as for the positioning of heliostats, solar and satellite tracking systems, electromagnetic radiation antennas, infrared optical sensors, advertising materials, hoists and cranes, weapons, and machines and equipment for maintenance and repair, and for the manipulation of remote tools or surgical implements, among many applications from large scale to small scale.

DISCUSSION

Current actuators manipulate and position objects in single axis and multiple axes of orientation, altitude, and azimuth in various fields such as solar power, astronomy, satellite communications, RADAR, thermal imaging, construction, weapon deployment, and advertising. With respect to large scale or heavy equipment applications, current actuators employ gear drives, planetary gears, hydraulic pistons, pneumatic pistons, screw drives, and various clockwork machinery to position large and heavy objects around stationary mounts. Due to their reliance on electrical motors and various hydraulic means to move heavy and large objects, current actuators require large numbers of precision-engineered parts and significant electrical power supply. Current actuators also require multiple heavy connections between structural members and actuators to support and position heavy and large objects. Hydraulic and electric drives require expensive hoses and cabling to transmit power. The heaviness and the precision metal-to-metal gearing and mechanics of current actuators dictate that normal metal fatigue, operational wear-and-tear and external stress, dust, contaminants, foreign objects, lubrication problems, and even minor operator errors and omissions create significant use-related damage, chattering, free play, and consequent degradation in accuracy and durability. Such actuators, which are also known as "clockwork" actuators, necessitate high costs of inspection, maintenance, repair, and replacement of precision-machined components, and consequent downtime from productive operations. The clockwork actuators also do not provide a smooth tracking motion, but a periodic stepping motion common to the motorized systems.

Some examples of single axis actuators are fluid pressure lifting jacks. The use of fluid pressure lifting jacks is common, some examples of which are disclosed in U.S. Pat. Nos. 1,745,959 and 5,492,300. These lifting devices produce large amounts of motive force as they expand. A typical application is the exhaust powered automobile lifting jack disclosed in U.S. Pat. No. 2,495,092. Similarly, U.S. Pat. Nos. 6,286,812, 6,918,575 and 5,651,155 disclose using such jacks for leveling surfaces in one axis with a fixed pivot at one or another end.

Actuators are used in the collection of solar energy. Solar energy can be collected through the concentration of sunlight by aiming an array of mirrors such that they reflect sunlight into a single fixed receiver to produce concentrated heat for steam production. For an example of such a power plant see U.S. Pat. No. 6,957,536. The motion of the earth in rotation and around the sun in orbit necessitates a mechanism for aligning the mirrors or panels in a position relative to the sun as it moves across the sky on a daily basis and relative to the horizon on a seasonal basis so that solar energy is continuously reflected onto the receiver. Examples of solar collectors that provide single-axis tracking are disclosed in U.S. Pat. No. 4,135,493 and U.S. Patent Application 2008/0128017. Other solar collectors track the sun's motion in multiple axes. In practical terms, devices to constantly orient a collector or mirror toward the sun must provide a means for continuously adjusting azimuth (rotation around the horizon line) and altitude (rotation from the horizon to a position directly overhead) to continuously track the apparent motion of the sun through the sky.

Current solar energy collectors include devices that rotate in a single axis and multiple axes to maintain the desired orientation of a panel of solar cells and solar thermal collectors or mirrors throughout the day and year. These devices are referred to as "heliostats" or "positioning systems." Thus far, current positioning systems are complex and expensive. Particularly as the size of the of the mirrors and photovoltaic panels increase to over 100 m$^2$ on a single tracker, the complex precision gear drives and powerful motors required to maneuver and stabilize the panels (particularly in high wind conditions) have emerged as the largest single cost barrier in pursuing large scale solar power generation. These clockworks are delicate and prone to mechanical failure or degradation under normal and abnormal operating conditions. These and other limitations of current heliostat technology are among chief barriers to lowering the cost of electrical generation via solar thermal or concentrated solar energy to equal or below cost of electricity from coal and natural gas-fired generating plants.

Other typical examples of the current heliostat technology include U.S. Pat. No. 3,070,643 disclosing a closed loop servo system for continuously pointing a solar cell directly toward the sun by sensing the sun's position and selectively driving the solar cell support about one or the other of a pair of axes. This patent discloses a complicated gearing system with a single drive motor and an electrically operated clutch to permit selective dual-axis drive. Another system, disclosed in U.S. Pat. Nos. 3,998,206 and 3,996,917, employs separate drive motors for obtaining dual-axis movement. The use of motor drives and gear reduction adds significantly to the cost of initial installation and maintenance of a sun tracking apparatus. In addition, the power required to drive the powerful motors creates a parasitic power drain on the operation of the solar power plant. The use of gear and motor drives is typical of the current actuators as disclosed in, by way of example, U.S. Pat. No. 6,440,019.

Another disadvantage of the current heliostat technology is its reliance, in most cases, on external sources of power. The current actuators require the provision of electrical or hydraulic power to orient the application. This generates a parasitic power drain on the installation, and also requires complicated and expensive electrical or hydraulic power distribution systems using cables or hoses for their operation. By their nature, heliostat arrays often cover many square kilometers, and thus, over a large installation, the provision of external power through cables to an array of thousands of heliostats adds to major capital and maintenance expense. The current actuators fail to achieve a low cost means of providing multi-axis sun tracking with minimal power requirements. Accordingly, there is a need for a cost and power efficient single and multi-axis actuator for use in small to large scale applications.

SUMMARY

An embodiment of a system for moving an object in one axis includes a fluid and one or more fluid containers within a cylindrical enclosure or drum, and a shaft running axially through the center of the drum and coupled to the drum by rotating assemblies so that the drum may rotate around the shaft. The system further includes one or more vanes running longitudinally and extending radially from the shaft to the inner surface of the drum, and one or more vanes running longitudinally and extending radially from the inner surface of the drum to the surface of the shaft. The object to be moved may be connected directly or indirectly to either the shaft or to the drum. The one or more fluid inflatable containers are arranged inside of the enclosure or drum around the shaft so that each container exerts expansive force between a vane fixed to the drum and a vane fixed to the shaft. A volume of the fluid is placed in the one or more fluid inflatable containers. The system further includes a fluid mover operably connected to the one or more fluid inflatable containers for moving the fluid into the one or more containers. The system further includes a fluid volume control for controlling the volume of fluid in the one or more fluid inflatable containers. By changing the volume or pressure of fluid in the one or more fluid inflatable containers, the object is moved.

In an embodiment, the object or application may be a photovoltaic panel, a solar reflecting mirror, a satellite dish, an infrared imaging sensor, an electromagnetic radiation antenna or emitter, a telescope, a sensor array, a detector, a weapon or weapons system, a thermal weapons system, a targetable weapon, a medical device, a medical robotics actuator, a diagnostic machinery and robot, an external or internal prostheses or prosthetic implant, a surgical or micromanipulation tool or device, an advertising material, signage, construction equipment, a patio umbrella, and a sun shade. The combination of more than one of such embodiments permits multi-axis motion of the object or application. PCT application number PCT/US2008/006660, filed May 23, 2008, and U.S. Provisional application No. 61/136,964 filed on Oct. 17, 2008 are hereby incorporated by reference.

BRIEF DESCRIPTION OF THE DRAWINGS

FIGS. 10A-10B shows side and frontal views respectively, of an exemplary rotating assembly for use in an embodiment of the system for moving an object in one axis.

Figure 1A:
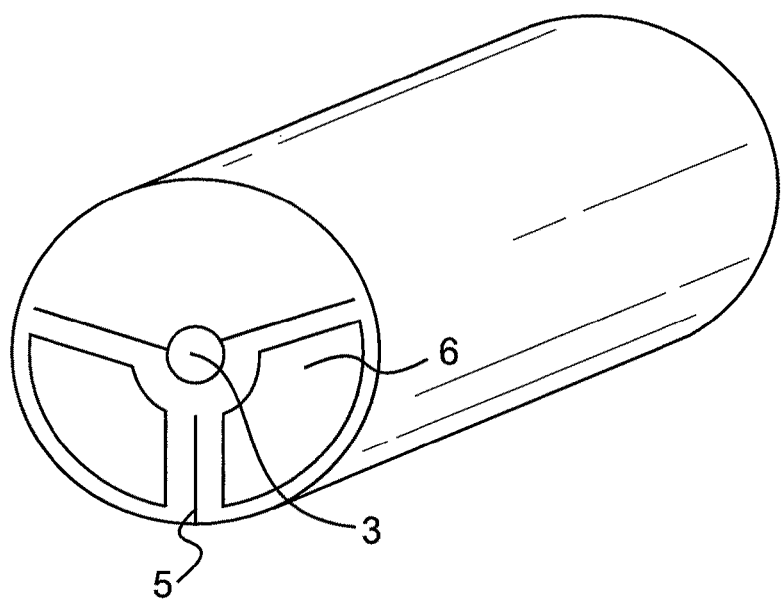
FIG. 1A-1B shows perspective views of a single embodiment of the system for moving an object in one axis with three vanes and two vanes, respectively.

Before one or more embodiments of the system for moving an object in one axis are described in detail, one skilled in the art will appreciate that the system for moving an object in one axis is not limited in its application to the details of construction, the arrangements of components, and the arrangement of steps set forth in the following detailed description or illustrated in the drawings. The system for moving an object in one axis is capable of other embodiments and of being practiced or being carried out in various ways. Also, it is to be understood that the phraseology and terminology used herein is for the purpose of description and should not be regarded as limiting.

DETAILED DESCRIPTION

Described herein are embodiments of a system and method for moving an object in a one axis. Embodiments of the system and method for moving an object in one axis are useful in various applications, such as in solar tracking applications, for example.

Referring now to FIG. 1A, shown is a perspective view of a single embodiment of the system 100 for moving an object in one axis. The system 100 shown comprises an enclosure 2, a reference or shaft 3, two fluid inflatable containers 6 and three vanes 5. The three vanes 5 are positioned longitudinally along the longitudinal axis.

In various embodiments, the system 100 includes at least one fluid container, also referred to as a fluid inflatable container 6 and an enclosure, which may be a drum 2. In the embodiment shown, the drum 2 extends circumferentially from the point of contact of each vane 5 fixed to the drum 2 to the point of contact of another vane 5 fixed to the drum 2. The vanes 5 may be fixed to the shaft 3 or to the enclosure 2. In one embodiment, one vane 5 is fixed to the shaft 3 and two vanes 5 are fixed to the enclosure 2. The system 100 shows one vane 5 extending from the shaft 3, clearing the drum 2 without making contact with the drum 2. The clearance between the vanes 5 and the shaft 3 or the vane 5 and the drum 2 is small enough to the prevent fluid inflatable containers 6 from moving under the vanes 5 in operation. Typically, the clearance will be slightly smaller than a single wall thickness of a fluid inflatable container 6. The vanes 5 may be constructed from steel of a thickness required to prevent deformation at the maximum force required to rotate the moving element of a drive. For example, a vane 5 will not deform if a large amount of moment is required to rotate the moving element of the drive. The geometry of a vane 5 may be a plate welded onto the drum 2 or shaft 3, or it may be a plate reinforced with gussets or ribs or other stiffening and strengthening structures, for example. Various materials may be used such as steel or plastic. In another embodiment, the drum 2 extends circumferentially from the point of contact of a vane 5 fixed to the drum 2 to a point of where a vane 5 fixed to shaft 3 clears the drum.

With continuing reference to FIG. 1A, the fluid inflatable containers 6 are shown positioned between the inner surface of the drum 2 and the outer surface of the shaft 3 and between one of the vanes 5 fixed to the drum 2 and one of the vanes 5 fixed to the shaft 3. In an embodiment of the system 100, either the drum 2 or shaft 3 may be fixed while the other rotates. The enclosure or drum 2 may be any apparatus for containing fluid inflatable containers and may be formed of a variety of shapes and materials. The shape of the enclosure 2 is not limited to a cylinder. For example, the enclosure 2 may be a triangular shape. The enclosure 2 may also have removable end caps or other removable portions for access to the inside of the enclosure. The end caps would have apertures for allowing the shaft 3 to go through them. Pipes, shafts or other fixed structures may be used as the reference 3 with the system 100. The fluid container 6 is further charged with varying amounts of non-volatile gas or fluid. In an embodiment, the fluid may be air, water, gas, oil, high density fluid, electro-reactive fluid, high viscosity fluid, or a solid at ambient temperature. For example, when the object 1 or application needs to be moved, the solid fluid may be heated by a heating device and transformed to a liquid. After the object or application is in place, the liquid may be cooled to ambient temperature and transformed back to a solid fluid.

Figure 1B:
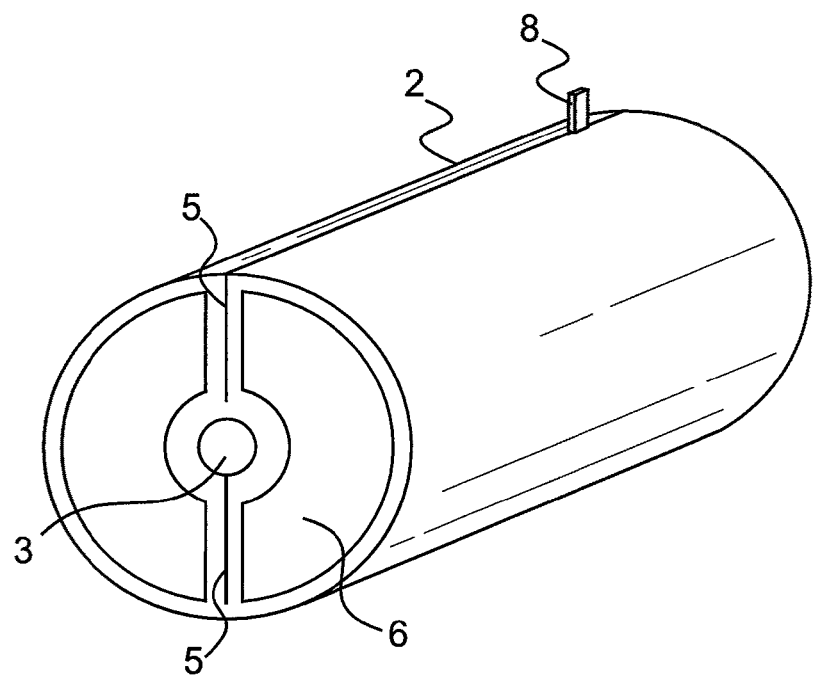

Referring now to FIG. 1B, shown is a perspective view of a single embodiment of the system 100 for moving an object in one axis. In this embodiment, two vanes 5 are shown running longitudinally along the shaft 3. Pressurizing all of the fluid inflatable containers 6 in the illustrated embodiment to equilibrium of pressure and volume will orient the object 1 in a horizontal level position, referred to as the neutral or "stow" position. A connector 44 (not shown) for connecting the object 1 to either the shaft 3 or the drum 2 may also be locked in this neutral or stow position during installation, maintenance or disassembly if one or more manually or mechatronically activated drift pins 8 are used. The drift pins 8 lock the drum 2 and shaft 3 in a fixed position. The drift pins 8 allow the system 100 to be stabilized independently of the fluid inflatable containers 6 and the object 1 to be stowed or locked in a secure configuration, such as may be required at the time of installation or during periods of maintenance work, which may include the deflation and repair or replacement of the fluid inflatable containers 6 or other components of the application. The system 100 may be locked in a low-profile, wind-stow position for extended periods of inclement weather including hurricanes in the area of a solar power plant or antenna array or other outdoor application subject to weather related stress.

The fluid inflatable containers 6 are preferably arranged inside of the drum 2 and, in one embodiment, run axially along the full length of the drum 2. The drum walls contain and channel the force generated by inflation or pressurization of the fluid inflatable containers 6. When pressurized with fluid, the fluid inflatable containers 6 seek to enlarge in volume, expanding with tremendous uniformly dispersed mechanical force equal to the surface area of the fluid inflatable container 6 in contact with the vanes 5 multiplied by the pressure introduced.

Movement of the connector 44 (not shown) to any position within at least a 180° range of elevation may be accomplished by systematically pressurizing and de-pressurizing the fluid inflatable containers 6 by use of the pressure control valve(s) 10 operatively connected to each fluid inflatable container 6. When changing position, the fluid inflatable container(s) 6 positioned opposite the direction of movement are depressurized to allow the pressure of the fluid inflatable container 6 opposite the direction of movement to force the object 1 into the desired position. When the object 1 is in the desired position, all of the fluid inflatable containers 6 will be pressurized to exert equal pressure and hold the object 1 rigidly in position. The speed of the desired movement is controlled by the speed of the pressure changes.

In an embodiment, fluid inflatable containers 6 exert force against another fluid inflatable container 6 and/or against a spring such as a torsion spring. In an embodiment one or more fluid inflatable containers 6 occupy less than the entire inner volume of the drum 2, with areas between fixed vanes 5 attached to the inner surface of the drum 2 allowing smaller fluid inflatable containers 6. The fluid inflatable containers 6 may be connected to each other and/or to a fluid mover with a tube to pass fluid. In another embodiment, a chemical reaction may be used to create gas or create pressure either in a storage tank or within a fluid inflatable container 6.

Figure 2:
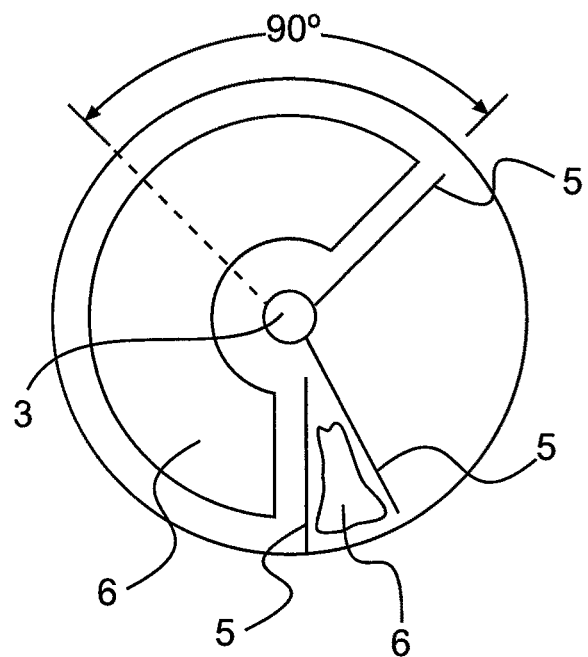
FIG. 2 shows a side view of a single embodiment of the system for moving an object one axis.

Referring now to FIG. 2, shown is an embodiment of system 100 with two fluid inflatable containers 6. One fluid inflatable container 6 is shown fully retracted or deflated and another is shown fully extended or inflated. One or more vanes 5 are shown running longitudinally along the inner surface of the drum and extending radially inward to the surface of the shaft. One or more vanes 5 also run longitudinally along the outer surface of the shaft 3 and extend radially inward to the inner surface of the drum. At least one, or in this example two fluid containers 6 form an annulus around the shaft and impinge against a vane 5 extending radially from the drum 2 and a vane 5 extending radially from the shaft 3. The fully inflated fluid inflatable container 6 is shown rotating the drum 90° from its neutral position (shown in FIGS. 1A-1B).

Figure 3:
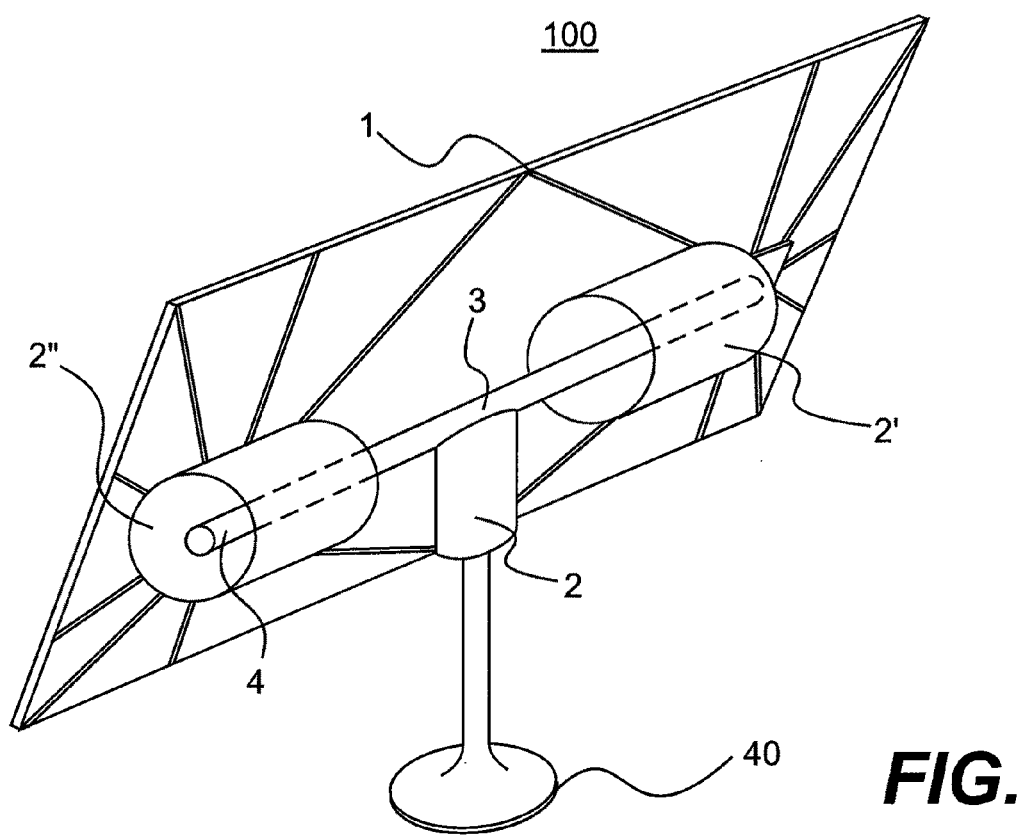
FIG. 3 shows a perspective view an embodiment of the system for moving an object in one axis including three drums arranged to provide multi-axis tracking.

Referring to FIG. 3, shown is a perspective view of an embodiment a system 100 for moving an object in one axis including three drums 2, 2' and 2," arranged to provide multi-axis tracking by rotating an object 1, shown as a heliostat mirror application, in a horizontal axis. An embodiment of a system 100 for moving an object in one axis includes the object to be manipulated or positioned (the "application") 1 which is operatively coupled to a shaft or pipe 3 running longitudinally through the center of the drums 2' and 2." In an embodiment, the object 1 is mounted on drums 2' and 2" by a connector 44. Rotating assemblies 4 hold the shaft 3 in a central axial position within the drums 2' and 2." In this embodiment, the shaft 3 is connected to the drums 2' and 2" by a rotating assembly 4, (not shown) which maybe a thrust bearing or other type of bearing, and a second bearing (not shown) which may be a plain contact, ball or other bearing suitable for carrying the weight and forces produced by wind loading on the application. The vanes 5 may be arranged in the drum 2 to provide a range of motion of slightly more than 180° such that, when coupled to an elevation drive, the heliostat provides full multi-axis motion to point the application at any selected point. In this embodiment, the shaft 3 is fixed to a central support structure, or pedestal 40. The shaft 3 may be rotated in one axis by the drums 2' and 2" while being rotated in another axis by another drum 2 acting as an azimuth drive. In this embodiment, a drums 2' and 2" together may act as an elevator drive. Other enclosures may be used in place of the drums 2, 2' and 2."

Figure 4:
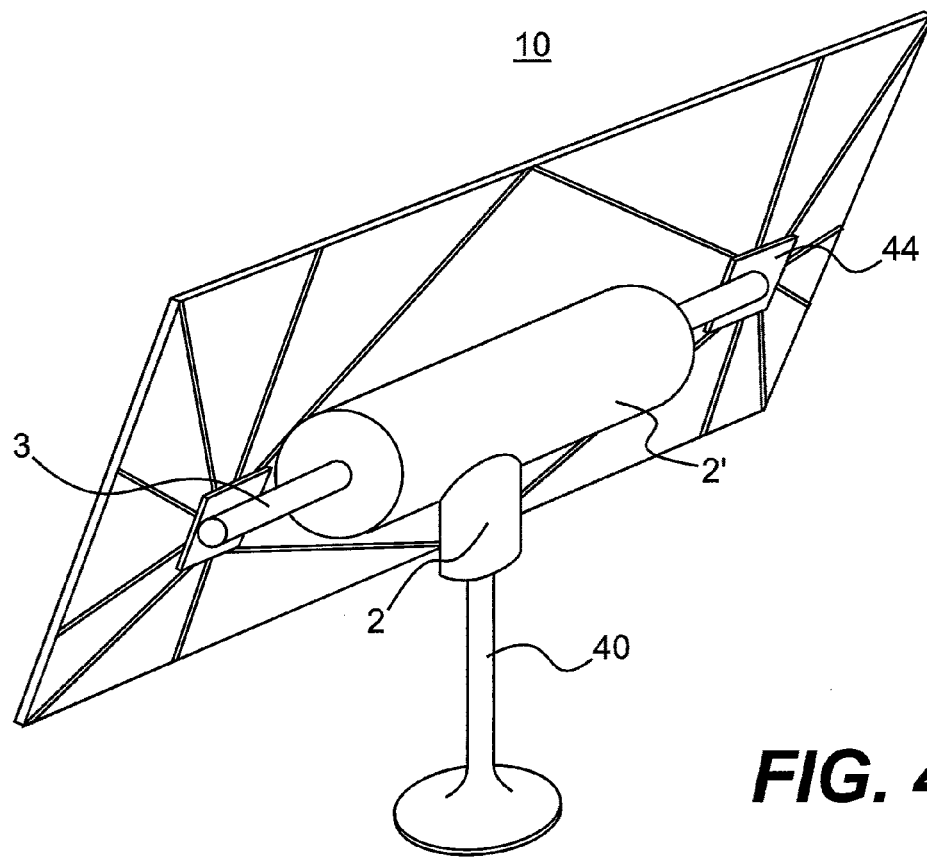
FIG. 4 shows a perspective view of three embodiments of the system for moving an object in one axis including two drums arranged to provide multi-axis tracking, while the object is mounted on a shaft.

Referring now to FIG. 4, shown is a perspective view of the system 100 for moving an object in one axis including two drums 2 and 2' arranged to provide multi-axis tracking. In the arrangement shown in FIG. 4, the object 1 may be mounted to the shaft or pipe 3 while the drum 2 remains fixed. In other embodiments, the object 1 may be mounted to a connecting structure such as the connector 44 shown that connects the object 1 reference or shaft 3. In this embodiment, the drum 2 is fixed upon a pedestal 40, but may be fixed upon any structure, including the ground. The drum 2 rotates upon the pedestal 40. Further, in this embodiment, the drum 2 may act as an azimuth drive coupled to another drum, drum 2,' acting as an elevator drive. In some embodiments, the connector 44 forms an integral part of the drum 2 or the shaft 3. In an embodiment of system 100, the connector may be bolts that connect the object 1 to the shaft 3 or drum 2. In another embodiment of system 100, the connector 44 may be a support structure for the object 1. FIGS. 1 and 2 show that more than one drum 2 may be combined to form a heliostat for multi-axis tracking of the sun with the elevation drive being coupled to the azimuth drive at right angles to one another. The provision of a second elevation drive ensures a fully redundant system for achieving wind stow in the event of a single elevation drive failure. The second elevation drive is optional and may be removed.

Figure 5:
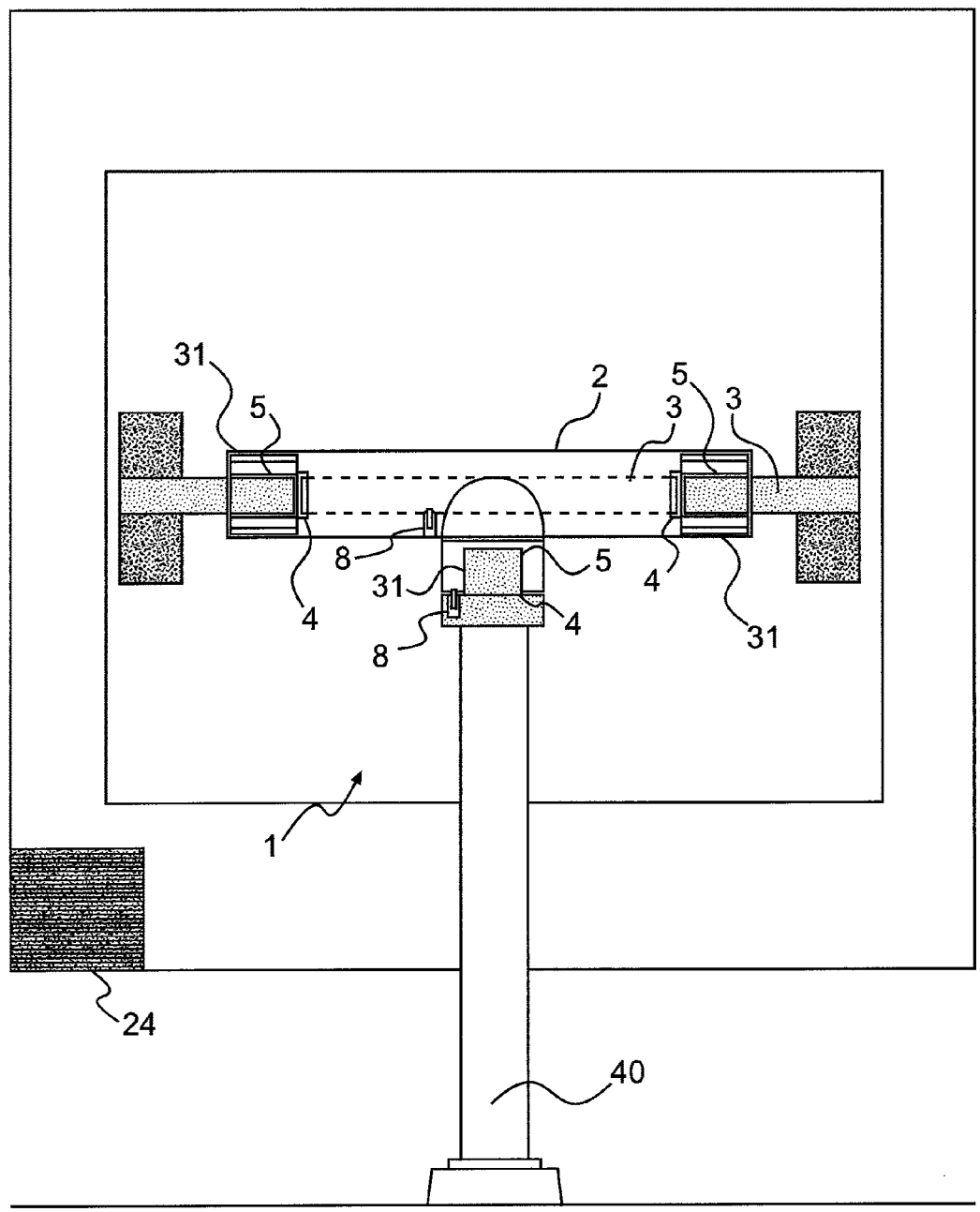
FIG. 5 shows a perspective view of three embodiments of the system for moving an object in one axis arranged to provide multi-axis tracking, with the object moved to a full-range elevation position perpendicular to the ground.

Referring now to FIG. 5, shown is a perspective view of a system 100 acting as an azimuth drive employed to rotate a heliostat mirror application 31 in a horizontal axis. The object 1 is shown moved to a full-range elevation position perpendicular to the ground. In this embodiment, the system 100 is fixed to a pedestal 40 while the shaft 3 freely rotates within the drum 2. The object 1 is coupled to the shaft 3 which is running axially through the center of the drum 2 and is held in place by one or more rotating assemblies 4. A power supply 24 is shown on the object 1.

Figure 6:
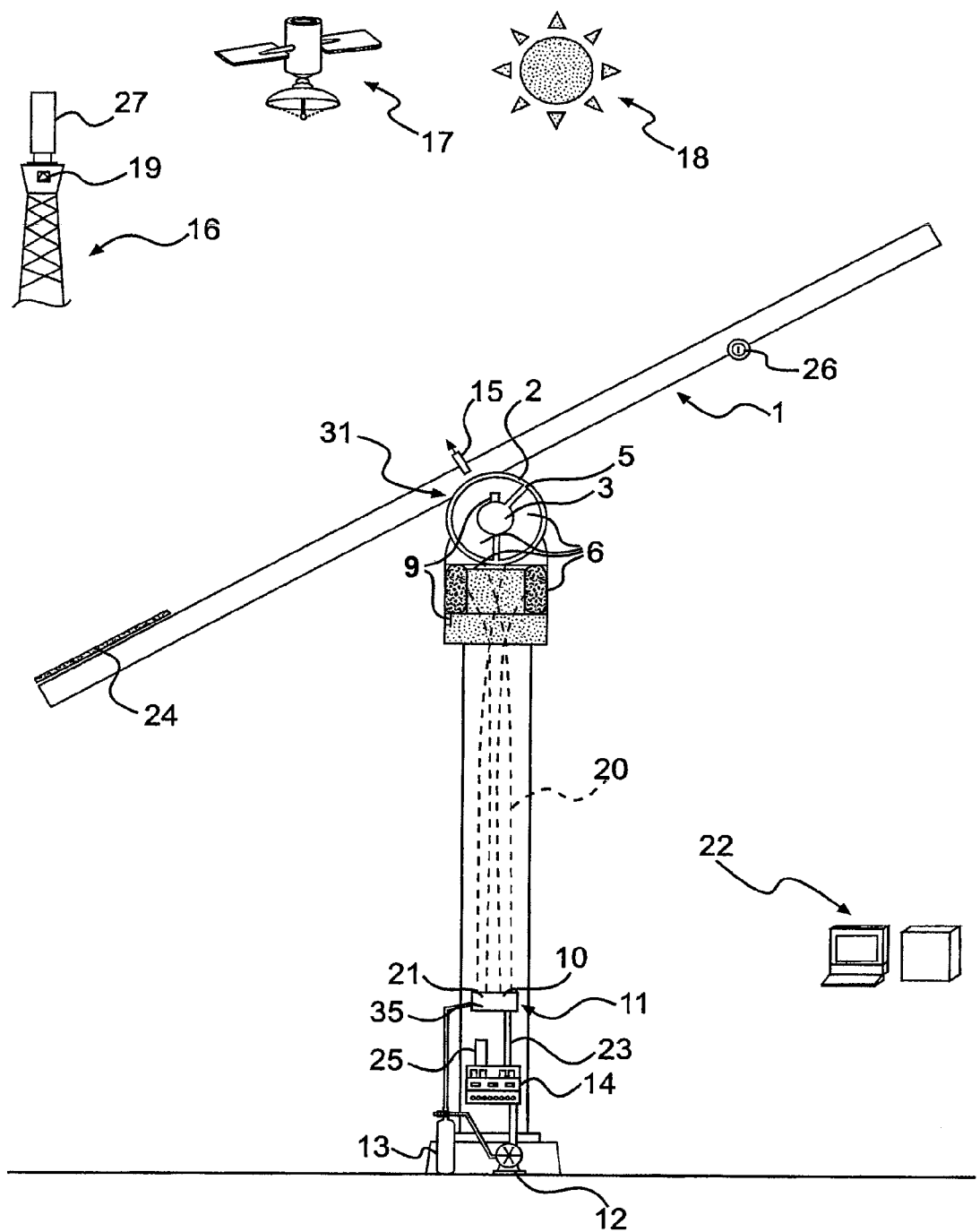
FIG. 6 shows a side view of three embodiments of the system for moving an object in one axis arranged to provide multi-axis tracking with all of the ancillary command and control systems shown.

Referring now to FIG. 6, shown is a side view of a system 100 acting as an azimuth drive employed to rotate a heliostat mirror application 31 in a horizontal axis. In this embodiment, the inner shaft 3 is fixed to the pedestal 40 and connected to the drum 2 by a rotating assembly 4 (not shown). The rotating assembly 4 may be a thrust bearing, or a slewing bearing, and a second bearing may be a plain contact, ball or other type of bearing suitable for carrying the weight and forces produced by wind loading on the application or object 1. The vanes 5 may be arranged in the drum 2 to provide a range of motion of slightly more than 180° such that, when coupled to an elevation drive, the heliostat provides full multi axis motion to point the application at any selected point. In an embodiment for each fluid inflatable container 6, a coupling may be provided to one or more motorized or computer controlled valve actuators 11 and control valves 10 to allow robotic control of the position of the application. The system for moving an object in one axis further includes a stop or other shock absorbing surface or device to prevent damage to un-inflated fluid inflatable containers 6 or the vanes 5 within the drum. This embodiment of system 100 includes a locking device, such as a manually or mechatronically deployed drift pin and a manifold 35 of air or fluid tubes connected to control valves 10 for pressurizing and de-pressurizing each fluid containers. This embodiment of the system 100 further includes electronic valve actuators 11 for activating the control valves 10, a source of compressed air or other fluid such as a compressor 12, hoses 20 to connect the fluid inflatable containers 6 to the control valves 10, compressor 12, and an optional storage tank for pressurized fluid 13. The computer 14, by processing information from the electronic pressure sensors 21, the ambient temperature sensor 25, the rotational position encoders 9 and/or the electronic level sensors 26, may calculate the present position of the application, determine the air volume and pressure changes necessary to effect within each fluid inflatable container 6 to actuate, drive, or move the object 1 or application to the desired position to maintain optimal orientation with respect to the target. The computer 14 may then activate the valve actuators 11 and activate the compressor 12 or the pressurized fluid storage system 13 to release compressed fluid into the hoses 20 attached to those fluid inflatable containers 6. The computer 14 may direct the inflation and deflation of the fluid inflatable containers 6 in order to actuate, drive, or otherwise move the object 1 or application to the desired position while simultaneously comparing and correcting the motion of the object 1 by evaluating the feedback obtained from the electronic level sensors 26 and/or the rotational position encoders 9. In some embodiments, these steps or activities do not occur simultaneously but in serial or within an accepted time frame depending upon the industry application.

The system 100 for moving an object in one axis embodied in FIG. 6 may include a laser positioning system as either a primary or secondary guidance system or positioning feedback system. The positioning system shown in this embodiment includes laser emitters 15 and laser receivers 19. The object 1 or application is fitted with a laser beam emitter 15 that emits a laser beam from the object 1 or application surface at a known angle relative to the object 1 or connector 44 (not shown). The laser beam is sensed by a laser sensor 19 shown in FIG. 6 positioned at the top of a solar receiver tower 16. The computer 14, by processing information electronically received from the laser sensor, may then orient the connector 44 and/or object 1 or application in the most advantageous position for insolating the target, in this case a solar thermal receiver 27. Also shown are power supplies such as a photovoltaic power source 24 and cables for the compression and control system 23. The manifold 35 may include one or more tubes inside of the larger manifold 35 and electronic pressure sensors 21 to monitor the pressure within the fluid containers and other parts of the pressurized fluid system. The system 100 further includes level sensors for elevation 26 (which may be mounted within or on the application or connector 44), electronic rotational position encoders 9, an ambient temperature sensor 25.

Additionally, the system for moving an object in one axis may be deployed in a solar power plant where solar radiation from the sun 18 is focused on a solar energy receiver 27, mounted on a solar tower 16, by an array of heliostats each containing multiple embodiments of the system for moving an object in one axis. These heliostats may include sensors and guidance system such as rotational position encoders 9 and computer hardware and software 14 for directing the actuators and movement as appropriate to the specific application, one or more laser emitters 15 mounted on the application or solar tower and one or more laser receivers 19 mounted on the solar tower 16 and a power supply 24 which may be a photovoltaic panel or other power source to supply power to the pressurized fluid system, the sensors and guidance systems, and a wireless or wired central array controller 22.

The computer 14, by processing information from the electronic pressure sensors 21, the ambient temperature sensor 25, the rotational position encoders 9 and/or the electronic level sensors 26, may calculate the present position of the application, determine the air volume and pressure changes necessary to effect within each fluid inflatable container to actuate, drive, or move the object or application to the desired position to maintain optimal orientation with respect to the target. The computer may then activate the valve actuators 11 and activate the compressor 12 or the pressurized fluid storage system 13 to release compressed fluid into hoses attached to those fluid inflatable containers 6 that need to inflate and simultaneously release fluid out of those fluid inflatable containers that need to deflate in order to actuate or drive or otherwise move the object or application to the desired position while simultaneously comparing and correcting the motion of the object 1 by evaluating the feedback obtained from the electronic level sensors 26 and/or the rotational position encoders 9. In some embodiments, these steps or activities do not occur simultaneously but in serial or within an accepted time frame depending upon the industry application.

Generally, there will be one inflation hose source per fluid inflatable container 6 or sealed sub chamber therein. The manifold 35 in an embodiment will usually have a pressure transducer port, an exhaust valve port and an inflation valve port. A single three-port valve could provide inflation and deflation with half the valves (1 valve per container). Examples of suitable valves that may be used in an embodiment are twelve-volt solenoid actuated gas valves and three-way servo actuated valves. Closed or open inflation systems may be used. Embodiments may be based on excess fluid upon deflation being bled into the atmosphere or being bled from one container into another or into a holding tank. Applications in the upper atmosphere, space, and underwater applications may need to reuse all available fluid in a closed system.

The system 100 for moving an object in one axis is able to provide highly dispersed but precisely controlled mechanical force to cause movement and precision positioning through the differential systematic pressurization and depressurization of the fluid inflatable containers 6. To perform their function, the fluid inflatable containers 6 require modest pressure, depending among other factors on the size of the application to be moved, external forces impinging on the application that must be countered (such as maximum wind load), the number of fluid inflatable containers 6, and the fluid inflatable container 6 surface contact area on the vanes 5 within the drum 2. In many applications or installations, a pressure range of approximately 8 psi to 150 psi, may be used. The compressor may be coupled to a pressurized fluid storage container 13 which allows the run time of the compressor to be reduced and provides a reserve supply of pressurized fluid for operation at low power during periods of external power interruption.

The fluid inflatable containers 6 are unaffected by normal and abnormal external stresses, vibration, or shaking applied to the object or application during operation. The force of pressure inside the fluid inflatable containers 6 is magnified by the surface area over which the fluid inflatable containers 6 apply force against the vanes 5 to move the object 1, and this distributed force allows them to easily absorb inertia or momentum created by the object itself (which may be exceedingly heavy and massive, far more massive than with current actuators) or exerted by externalities acting upon the object. The fluid inflatable containers 6 may be made of almost any of multiple conventional expandable or non-expandable inflatable materials, from natural or synthetic elastomers such as rubber or silicone, to coated nylon fabrics typical of "Zodiac" pontoon boats to coated fabric bladders typically used for fuel cells in auto racing, aviation, and in shipping for ballast and dunnage.

In an embodiment, the object 1 being moved is counterbalanced by a weight. This weight may be placed on the opposite side of the drum 2 and shaft 3 from the object 1. The counterbalance or weight may be used to reduce the amount of force needed to move the object. Ultimately, the weight can be used to bias the system 100 or object into a stowed position in the event of a failure of the fluid system.

With continuing reference to FIG. 6, the system 100 for moving an object in one axis may be stabilized in a stow or other desired position by means of a drift pin which will positively lock the system in position during installation or any period when the parts of the system 100 for moving an object in one axis are removed or replaced and the object 1 or has no fluid inflatable containers 6 control its position.

The system 100 may move an object or application in a stop-and-go fashion or in a continuous, smooth motion without a stepping function, unlike electric stepper motors. Sudden stops and changes in momentum of even heavy applications are easily borne by the system 100 for moving an object in one axis without damage, since the mechanism naturally disperses and absorbs shocks as elastic rather than inelastic impacts or collisions.

Figure 7:
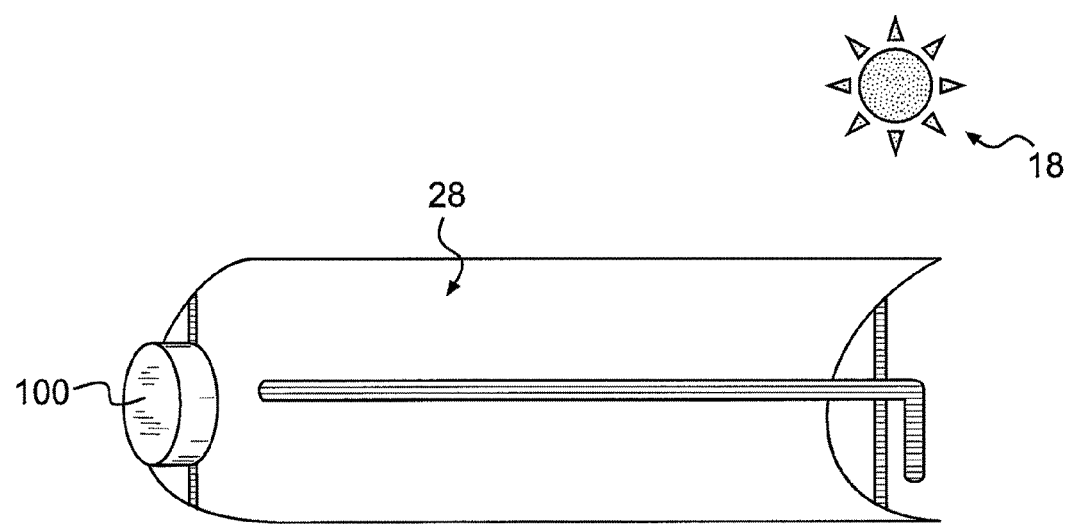
FIG. 7 shows a perspective view of an embodiment of the system for moving an object in one axis arranged to provide single axis tracking for a parabolic solar collecting trough.

Referring now to FIG. 7, shown is a perspective view of the system 100 for moving an object in one axis arranged to provide single axis tracking for a solar collecting trough 28 by tracking the sun's apparent motion across the sky during the course of a day.

Figure 8:
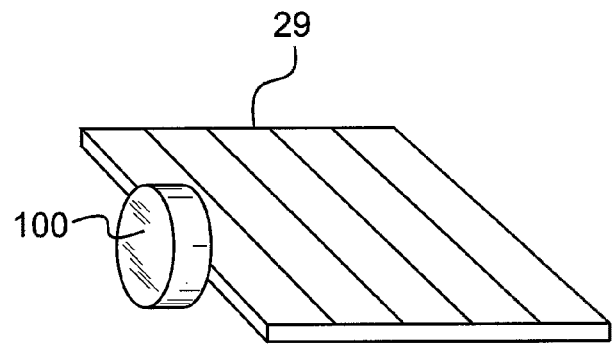
FIG. 8 shows a perspective view of an embodiment of the system for moving an object in one axis arranged to provide single axis tracking for a solar photovoltaic panel.

Referring now to FIG. 8, shown is a perspective view of the system 100 for moving an object in one axis arranged to provide single axis tracking for a solar photovoltaic panel 29 to increase the efficiency of the panel by tracking the Sun's 18 apparent motion across the sky during the course of a day.

Figure 9:
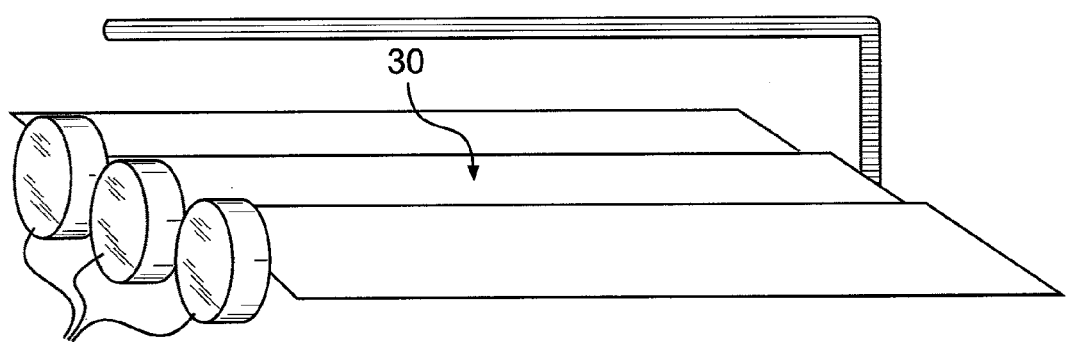
FIG. 9 shows a perspective view of an embodiment of the system for moving an object in one axis arranged to provide single axis tracking for a Fresnel solar collecting trough.

Referring now to FIG. 9, shown is a perspective view of the system 100 for moving an object in one axis may be arranged to provide single axis tracking to a single flat mirror segment 30. The system 100 thereby concentrates the sun's energy onto a fixed receiver pipe in a Fresnel type trough solar collector.

Referring now to FIG. 10A-10B, shown are side and frontal views of an exemplary rotating assembly 4 for use in an embodiment of the system for moving an object in one axis, respectively. Referring to FIG. 10B, shown are three or more casters 41 mounted on the drum 2 and arranged such that the shaft 3 is supported and can freely rotate in the center of the drum 2. Each of the casters 41 is attached to the rotating assembly 4 with one or more bolts 42. Each of the casters 41 is directly or indirectly attached to the drum 2. The rotating assembly 4 may be mounted outside of the drum 2, on an outside surface such as an end cap of a drum 2. The rotating assembly 4 may also be mounted inside the drum 2 on the inside of an end cap of the drum 2, for example. The rotating assembly 4 may also be connected to the drum 2 by a frame holding the rotating assembly 4 in place. The casters 41 may be easily removed for field service. A caster 41 can be replaced when it is not in contact with the shaft 3. In one embodiment, one or more casters 41 is adjustable so that it may be moved away from the shaft to create a small tolerance within which the shaft 3 may be moved radially away from each of the casters 41. In this manner, casters 41 may be may be replaced one at a time. In another embodiment, the shaft 3 is moved by employing a conventional hydraulic or mechanical jack. The jack can be removed once a caster 41 is replaced and the one or more adjustable casters are tensioned to firmly hold the shaft 3 in position. The shaft 3 typically runs radially through the central axis of the drum 2. The casters 41 can be replaced without "dismasting" or removing the shaft 3 and without removing other casters 41.

Note that "up," "down," "upper," "lower," and "central" are all relative and may be inverted or oriented or characterized differently in some applications.

Several elements of the embodiments may vary significantly while not changing the essential function or mechanism of action of the system for moving an object in one axis. In one embodiment of the system 100, one or more spring-loaded tensioning cables or other elastic tensioning devices for moving an object, such as compression or torsion springs, may be substituted for one or more fluid inflatable containers 6, or may be used in conjunction to stabilize the object 1 or application during installation, maintenance, replacement or operation. The embodiment may include the use of stacked, nested, folding, accordion, or leaf-shaped or configured fluid inflatable actuators. Springs may be added inside the fluid inflatable containers 6. Springs may be used inside the enclosure 2. The specific shape of a fluid inflatable container 6 may vary widely, and may change during operation, such that they resemble wedges, cones, cylinders, pontoons, arcs, or crescents. Torsion or other types of spring devices may also be used to apply a force on the drum 2 or on the shaft 3. The shape of the enclosure 2 for enclosing the fluid inflatable container 6 may vary widely and may resemble a wedge, oval, cone or cylinder, for example. Typically, the shaft 3 would pass through the enclosure 2 but may be located outside the enclosure 2.

Multiple embodiments of the system 100 for moving an object in one axis may be attached together for certain applications that may require multi-axis movement. In this "two axis configuration" the structure of one actuator assembly attaches indirectly or directly to the structure of another actuator assembly such that each actuator provides motion in one axis. Such a configuration is shown in FIGS. 3-6.

Finally, in many of the embodiments of the system 100 for moving an object in one axis, the motive force for the system 100 may be provided by one or more small and efficient air compressors. A small solar panel or battery may provide sufficient power to position the entire surface, and also power the control and communications unit. Alternatively, one or more large industrial compressor and storage tank may be situated and connected to provide pressurized fluid to many fluid inflatable containers within an installation of many such systems for moving an object in one axis such as a parabolic trough solar collector array or a radio-telescope array.

The various systems 100 shown for moving an object in one axis are new types of rotary drive mechanisms. The systems can be embodied in a wide variety of uses or applications requiring single axis control and orientation of large or small, light or heavy objects. The embodiments are particularly suited to manipulation of large and heavy objects under external stresses, where other mechanisms would be too delicate, fault-prone, and/or costly. The system may also be used on small or even micro-scale where other mechanisms would be too intricate and costly, or would be otherwise less suited to the application.

The system and 100 for moving an object in one axis also stabilizes large, and heavy objects in a variety of wind conditions by using a balance of forces produced by the strategic placement and pressurization of fluid inflatable containers and the static force of a fixed mooring. This is an improvement over the current actuators because the massive pressures in balance keep the system stable in very high winds, allowing use in conditions that would otherwise be difficult or very expensive. Additional dynamic tuning may be accomplished by coupling a torsion spring to the shaft 3 and the drum 2, thus adding a predictable spring constant to the system's dynamic behavior.

The system and method for moving an object in one axis may be used to construct a multi-axis positioning system that may be remotely controlled without requirement of external control cabling.

The system for moving an object in one axis may use either or both wired and wireless control systems the latter of which provide simplified central operation of one or more units. Various wireless control systems may be used.

The system 100 for moving an object in one axis may also be integrated into a dual-axis tracker that may support a variety of objects including antennae, advertising billboards, video screens, hoisting equipment and other items. The system 100 may also be integrated into a dual-axis positioning system characterized by an ease of installation, simplicity of construction, and which may be sold and installed and repaired at moderate expense.

Figure 11:
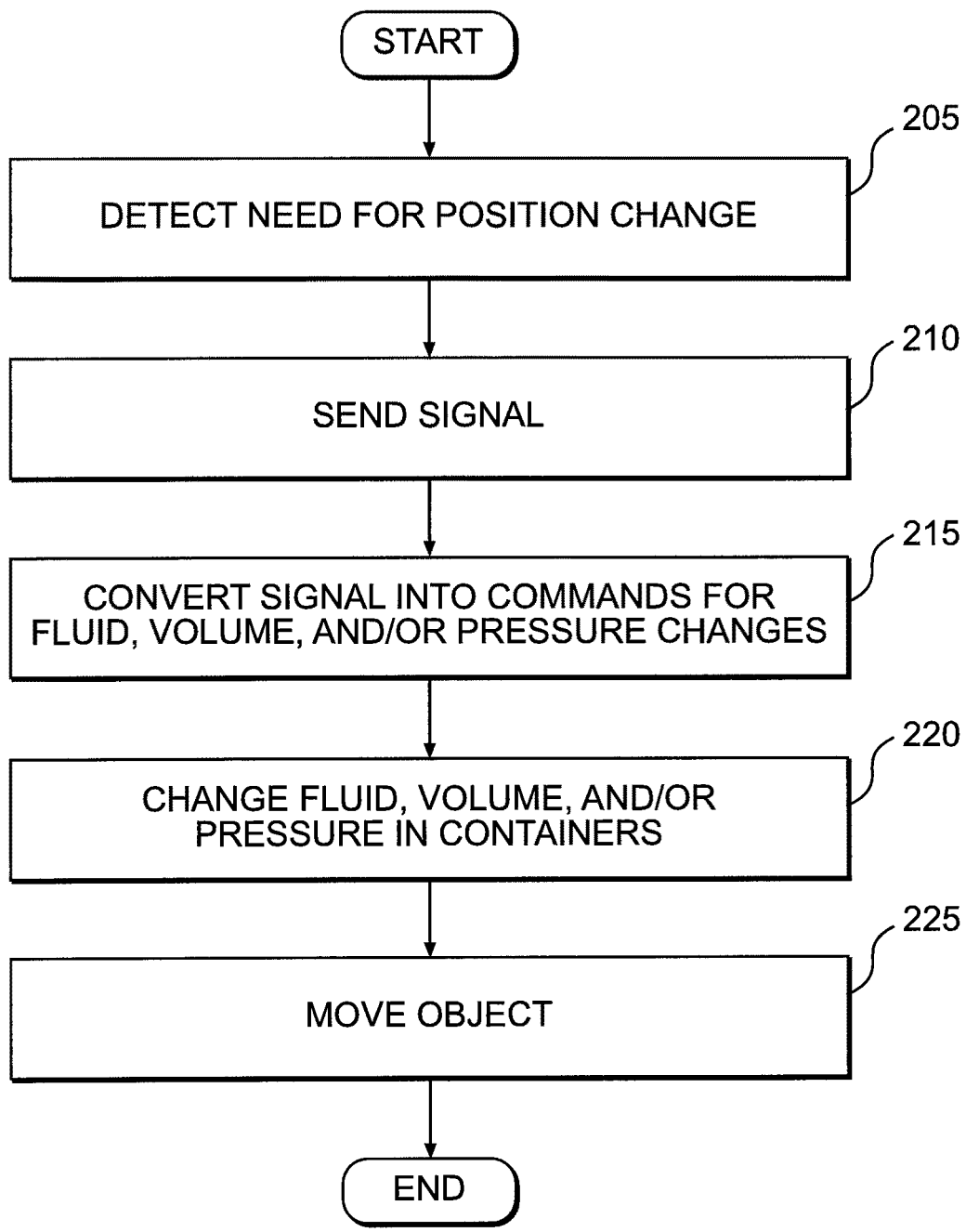
FIG. 11 shows a flow-chart of an embodiment of a method for moving an object in one axis.

Referring now to FIG. 11, shown is a flow-chart of an embodiment of a method 200 for moving an object in one axis. The exemplary method includes providing at least one fluid container 6, providing a guidance system that detects a need for a change in position 205 and sends a data signal 210 to a control system or computer 14. The guidance system may include a laser positioning system as either a primary or secondary guidance system. The laser positioning system includes a laser beam emitter 15 that emits a laser beam from the surface of the object 1 at a known angle relative to the object 1 or connector 44. The laser beam is sensed by a laser sensor 19 (that resides on a solar tower, for example) that sends a data signal to the computer 14. Other components of a guidance system (FIG. 6) are described above. The computer 14 interprets the data signal and converts the data signal into commands for pressure changes or fluid volume changes 215. The computer 14 activates one or more pumps via signals to change the volume and pressure 220 of the fluids in one or more of the fluid inflatable containers 6. The change of the volume in one or more of the fluid containers 6 moves the object 255. As a result, the object 1 is moved as directed by the guidance system.

It should be noted that the embodiments of the system for moving an object in one axis are not limited to the above explanation. The objects, advantages, features and uses of the system for moving an object in one axis will be more apparent from the following detailed description in reference to the accompanying drawings. Various modifications all reside in the scope of the embodiments.

In the foregoing detailed description, systems and methods in accordance with embodiments of the system for moving an object in one axis are described with reference to specific exemplary embodiments. Accordingly, the present specification and figures are to be regarded as illustrative rather than restrictive. The scope of the system for moving an object in one axis is to be further understood by the numbered examples appended hereto, and by their equivalents.

Further, in describing various embodiments, the specification may present a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art may readily appreciate that the sequences may be varied and still remain within the spirit and scope of the various embodiments.

What is claimed is:

1. A system for moving an object in one axis relative to a reference, comprising:

a connector for the object;
a central support structure located beneath the object;
a drum operatively connected to the reference, wherein the drum has an inner wall, pivot axis and an outer surface;
wherein the reference is a shaft, having an outer surface, positioned axially through the pivot axis of the drum;
one or more rotating assemblies supporting the shaft such that the shaft may turn within the drum;
one or more vanes fixed to the shaft, running longitudinally along the shaft and extending radially to the inner wall of the drum;
one or more vanes fixed to the drum, running longitudinally along the inner wall of the drum and extending radially to the outer surface of the shaft;
a first fluid inflatable container placed inside the drum between one of the one or more vanes fixed to the drum and one of the one or more vanes fixed to the shaft such that expansion of the first fluid inflatable container exerts force simultaneously upon the vane fixed to the drum and the vane fixed to the shaft;
one or more control valves, operatively connected to the first fluid inflatable container, to assist in pressurizing and de-pressurizing the first fluid inflatable container;
a source of compressed fluid connected operatively to the one or more control valves for pressurizing the first fluid inflatable container;
an electronic pressure sensor connected to the first fluid inflatable container;
electronic actuators for the one or more control valves for pressurizing and de-pressurizing the first fluid inflatable container;
electronic level sensors or rotational position encoders for determining an altitude, azimuth, and pitch of the object; and
a computer that controls the motion of the object to maintain an optimal solar energy collection by electronically actuating the one or more control valves in response to signals received from the electronic pressure sensor and the electronic level sensors or rotational position encoders;
wherein the system for moving an object in one axis is able to orient the object through a variety of positions by systematic pressurization and depressurization of the first fluid inflatable container.

2. The system of claim 1, further comprising:
a second fluid inflatable container operatively connected to one or more control valves, wherein the second fluid inflatable container is pressurized by the compressed fluid; and
wherein the forces imposed by pressurizing the first fluid inflatable container against the vanes are opposed by the compressive forces imposed by the second fluid inflatable container.

3. The system of claim 1, wherein the drum is operatively connected to the connector.

4. The system of claim 1, wherein the connector is operatively connected to the shaft.

5. The system of claim 1, further comprising:
a shock absorbing device for preventing damage to system components; and
a locking device including a drift pin.

6. The system of claim 1, further comprising at least two drums.

7. The system of claim 1, further comprising:
one or more torsion springs configured to resist the movement of the object from a neutral position.

8. The system of claim 1, further comprising:
a positioning system, wherein the source of compressed fluid is a compressor mounted on the positioning system;
an electronic pressure sensor connected to the first fluid inflatable container;
electronic actuators for the one or more control valves for pressurizing and de-pressurizing the first fluid inflatable container, wherein the electronic level sensors are for determining an altitude and azimuth of the object; and
a computer capable of communicating output values of the electronic pressure sensor and the electronic level sensors, and positions of the one or more control valves through electromagnetic signals.

9. The system of claim 1, further comprising:
a positioning system, wherein the source of compressed fluid is a compressor mounted on the positioning system;
an electronic pressure sensor connected to the first fluid inflatable container;
electronic actuators for the one or more control valves for pressurizing and de-pressurizing the first fluid inflatable container, wherein the electronic level sensors are for determining an altitude and azimuth of the object; and
a computer integrated with the connector that communicates output values of the electronic pressure sensor and the electronic level sensors, and positions of the one or more control valves through electromagnetic signals, the computer receiving and executing commands to reposition the object, wherein the object comprises a solar energy collecting surface, through electromagnetic signals.

10. The system of claim 1, further comprising:
a positioning system, wherein the source of compressed fluid is a compressor mounted on the positioning system;
an electronic pressure sensor connected to the first fluid inflatable container;
electronic actuators for the one or more control valves for pressurizing and de-pressurizing the first fluid inflatable container, wherein the electronic level sensors, are integrated with the support structure, for determining an altitude and azimuth of the object; and
a photovoltaic power source that powers the electronic pressure sensor, the electronic level sensors, the compressor, the one or more control valves, and the computer.

11. The system of claim 1, further comprising:
a positioning system, wherein the source of compressed fluid is a compressor mounted on the positioning system;
an electronic pressure sensor connected to the first fluid inflatable container;
electronic actuators for the one or more control valves for pressurizing and de-pressurizing the first fluid inflatable container, wherein the electronic level sensors are for determining an altitude and azimuth of the object, and wherein the computer has wireless communication capabilities integrated with the connector; and
a photovoltaic power source to power the electronic pressure sensor, the electronic level sensors, the compressor, the one or more control valves, and the computer, wherein the computer regularly transmits a status of the first fluid inflatable container and outputs values of the electronic pressure sensor, the electronic actuators, the electronic level sensors, and the photovoltaic power source to an external control system.

12. A system for moving an object in one axis relative to a reference, comprising:
- a connector for the object;
- a drum operatively connected to the reference, wherein the drum has an inner wall, pivot axis and an outer surface;
- wherein the reference is a shaft, having an outer surface, positioned axially through the pivot axis of the drum;
- one or more rotating assemblies supporting the shaft such that the shaft may turn within the drum;
- one or more vanes fixed to the shaft, running longitudinally along the shaft and extending radially to the inner wall of the drum;
- one or more vanes fixed to the drum, running longitudinally along the inner wall of the drum and extending radially to the outer surface of the shaft;
- a first fluid inflatable container placed inside the drum between one of the one or more vanes fixed to the drum and one of the one or more vanes fixed to the shaft such that expansion of the first fluid inflatable container exerts force simultaneously upon the vane fixed to the drum and the vane fixed to the shaft;
- one or more control valves, operatively connected to the first fluid inflatable container, to assist in pressurizing and de-pressurizing the first fluid inflatable container; and
- a source of compressed fluid connected more control valves for pressurizing the first fluid inflatable container;
- wherein the system for moving an object in one axis is able to orient the object through a variety of positions by systematic pressurization and depressurization of the first fluid inflatable container; and
- wherein the rotating assemblies include three or more casters mounted directly or indirectly on the enclosure for supporting the reference and allowing the reference to freely rotate within the drum.

13. The system of claim 12, wherein each caster is adjustable for creating a tolerance between the caster and the shaft and each caster is mounted to a rotating assembly with one or more bolts.

14. A system for moving an object in one axis relative to a reference, comprising:
- a connector for the object;
- a drum operatively connected to the reference, wherein the drum has an inner wall, pivot axis and an outer surface;
- wherein the reference is a shaft, having an outer surface, positioned axially through the pivot axis of the drum;
- one or more rotating assemblies supporting the shaft such that the shaft may turn within the drum;
- one or more vanes fixed to the shaft, running longitudinally along the shaft and extending radially to the inner wall of the drum;
- one or more vanes fixed to the drum, running longitudinally along the inner wall of the drum and extending radially to the outer surface of the shaft;
- a first fluid inflatable container placed inside the drum between one of the one or more vanes fixed to the drum and one of the one or more vanes fixed to the shaft such that expansion of the first fluid inflatable container exerts force simultaneously upon the vane fixed to the drum and the vane fixed to the shaft;
- one or more control valves, operatively connected to the first fluid inflatable container, to assist in pressurizing and de-pressurizing the first fluid inflatable container;
- a source of compressed fluid connected operatively to the one or more control valves for pressurizing the first fluid inflatable container;
- a positioning system;
- a compressor mounted on the positioning system;
- an electronic pressure sensor connected to the first fluid inflatable container;
- electronic actuators for the one or more control valves for pressurizing and de-pressurizing the first fluid inflatable container;
- electronic level sensors for determining an altitude, azimuth, and pitch of the object;
- rotational position encoders to encode the rotational position of the drum or the shaft; and
- a computer that controls motion of the object to maintain an optimal solar energy collection by electronically actuating the one or more control valves in response to signals received from the electronic pressure sensor, the rotational position encoders and the electronic level sensors;
- wherein the system for moving an object in one axis is able to orient the object through a variety of positions by systematic pressurization and depressurization of the first fluid inflatable container.

15. A system for moving an object in one axis relative to a reference, comprising:
- a connector for the object;
- a drum operatively connected to the reference, wherein the drum has an inner wall, pivot axis and an outer surface;
- wherein the reference is a shaft, having an outer surface, positioned axially through the pivot axis of the drum;
- one or more rotating assemblies supporting the shaft such that the shaft may turn within the drum;
- one or more vanes fixed to the shaft, running longitudinally along the shaft and extending radially to the inner wall of the drum;
- one or more vanes fixed to the drum, running longitudinally along the inner wall of the drum and extending radially to the outer surface of the shaft;
- a first fluid inflatable container placed inside the drum between one of the one or more vanes fixed to the drum and one of the one or more vanes fixed to the shaft such that expansion of the first fluid inflatable container exerts force simultaneously upon the vane fixed to the drum and the vane fixed to the shaft;
- one or more control valves, operatively connected to the first fluid inflatable container, to assist in pressurizing and de-pressurizing the first fluid inflatable container; and
- a source of compressed fluid connected operatively to the one or more control valves for pressurizing the first fluid inflatable container;
- wherein the fluid is a solid at ambient temperature and may be heated by a heating device and transformed to a liquid to move the object, wherein after the object is in place, the liquid may be cooled to ambient temperature and transformed back to a solid fluid; and
- wherein the system for moving an object in one axis is able to orient the object through a variety of positions by systematic pressurization and depressurization of the first fluid inflatable container.

* * * * *